Aug. 5, 1969  V. W. MAXWELL  3,459,619

METHOD FOR PROTECTING COATED PIPE

Filed Oct. 25, 1966  2 Sheets-Sheet 1

Victor W. Maxwell
INVENTOR.

BY Arnold and Roylance

ATTORNEYS

Victor W. Maxwell
INVENTOR.

BY Arnold and Roylance
ATTORNEYS

United States Patent Office 3,459,619
Patented Aug. 5, 1969

3,459,619
METHOD FOR PROTECTING COATED PIPE
Victor W. Maxwell, Houston, Tex., assignor to American Machine & Foundry Company, New York, N.Y., a corporation of New Jersey
Filed Oct. 25, 1966, Ser. No. 589,333
Int. Cl. B32b 1/08, 23/04; B65b 59/06
U.S. Cl. 156—293                                   5 Claims

ABSTRACT OF THE DISCLOSURE

A protector for the end of a pipe having an internal coating of a corrosion resistant material. The corrosion resistant material is applied in an uncured condition and covers at least one end of the pipe. A protector ring of elastomeric material is applied in circumferential contact with the pipe end and terminates at the end so as not to interfere with the external threads at the end region of the pipe. The corrosion resistant material is baked to achieve final curing whereby the protector becomes an integral part of the pipe end.

---

A "joint" or coupled section of oil field pipe, as such terms are commonly used in the industry, comprises an externally threaded "pin" portion and an internally threaded "box" portion, the pin and box portions being so constructed that they threadedly mate to produce a continuous length of pipe.

Pipe for many usese is customarily coated. For example, oil field pipe is generally coated internally to protect the pipe from the extreme environmental conditions to which the pipe may be subjected down-hole. But the end of the pin is very difficult to coat to an extent affording adequate protection to that area of the pipe. By "end," as the term is used in this specification, is meant the circumferential extremity or edge of the pin at the end of the threads which is placed into the box for make-up of the pipe length, and not the entire pin portion. Further, the pin end is the area which is most vulnerable to physical damage, especially during make-up of the pipe joints since it is customary to "stab" the pin into the box in effecting the make-up. In fact, the pin end is where the great majority of physical damage to the pipe coating occurs. Therefore, the pin end coating has long been recognized as the weakest link in the chain of protection of internally coated pipe having pin and box portions. Indeed, improvements in coating compositions and methods within the last few years have made certain pipe sections virtually impenetrable except at the pin end.

This fact of the "weak link" at the pin end may be even more clearly brought into focus when it is realized that, although typical coating thicknesses for oil field pipe, for instance, may be about 5 to 7 mils for the balance of the pipe, it is virtually impossible to get more than 2 to 3 mils thickness on the sharp pin end. When it is again noted that it is at this point that likelihood of physical damage is greatest, and yet this point has a thinner coating than the balance of the pipe, the unsatisfactory situation which exists is seen to be striking.

For these reasons, the industry has long sought methods and apparatus which could effectively lead to improved protection for pin end coatings. The prior art has failed, however, to adequately solve the problem without creating equally severe problems such as covering of the threads causing interference with make-up.

Another problem which has occupied the attention of pipe designers and coating specialists for many years is the problem of providing for an effective seal at the pin end. While various attempts at solution of this problem have been made, the provision of a seal effective at the pin end while leaving the threads uncovered remains a serious problem.

The present invention provides, for the first time, method and apparatus suitable for adequately protecting the pin end coatings which do not require covering the pin threads and thus do not interefere with make-up of the pipe. In accordance with the invention, such coatings are protected from damage both during make-up of the pipe sections and also during transportation and handling of the coated pipe.

Further, the invention provides an effective and economical seal between the pin end and the adjacent thread to prevent the escape of fluids in the pipe interior around the lip of the pin to the external environs of the pipe. Still further, the foregoing seal is provided in combination with pen-end-protector.

In order that the invention may be more fully understood, one embodiment thereof will be explained with reference to the accompanying drawings, which form a part of this specification and wherein.

Figure 5:
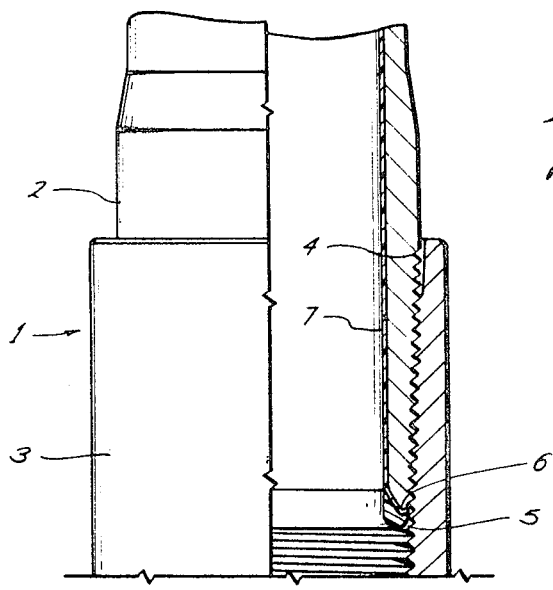
FIGURE 5 is a vertical sectional view of the tubing joint formed by the make-up of the pin portion illustrated in FIGURE 2 with a mating box portion.

Referring now more particularly to the drawings, there is illustrated in FIGURE 5 a tubing joint 1 comprising a pin 2 and a box 3. The pin is equipped with external threads 4 and the box is equipped with mating internal threads 5. The pin and the threads thereof terminate at a relatively sharp circumferential end 6. The pin is coated with coating 7, and the box has a thin coating which is not shown.

Figure 1:
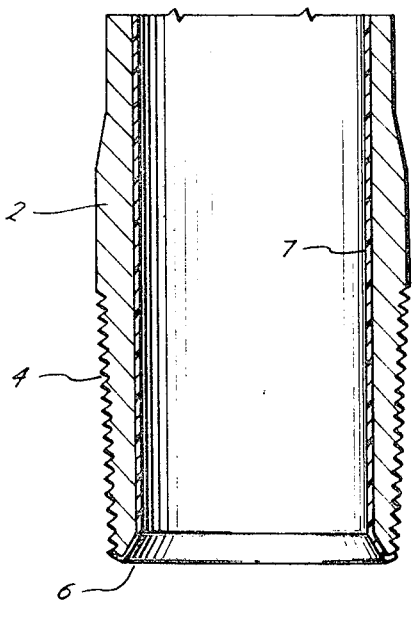
FIGURE 1 is a side view partially in section, of an internally-coated pin portion of a tubing joint of the prior art.

FIGURE 1 illustrates the pin portion 2 only of the tubing joint. Here too are seen the external threads 4, the termination of the pin at the circumferential end 6, and the internal coating 7.

Figure 2:
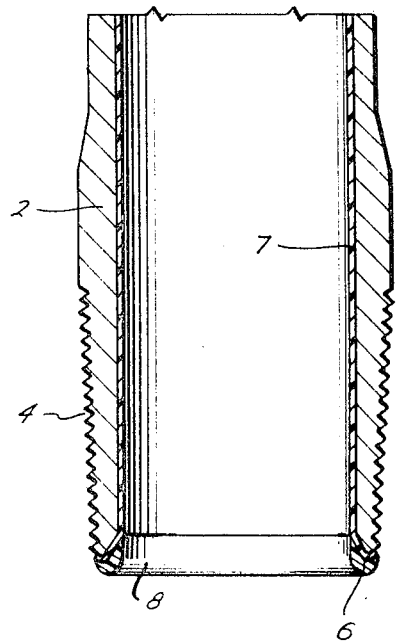
FIGURE 2 is a view similar to FIGURE 1 wherein a ring constructed in accordance with the present invention has been affixed to the pin portion.

In FIGURE 2, the end 6 is seen to be covered with a ring 8 constructed in accordance with this invention.

Referring back now to FIGURE 5, the sealing action of the ring 8 is clearly seen since this figure illustrates the pin of FIGURE 2 after make-up with box portion 3.

Figure 3:
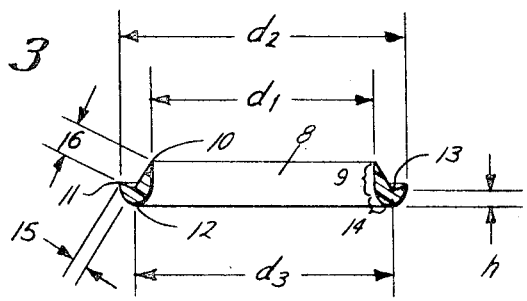
FIGURE 3 is a cross-sectional view of a ring constructed in accordance with one embodiment of this invention, before application of the ring to the pin portion.
Figure 4:
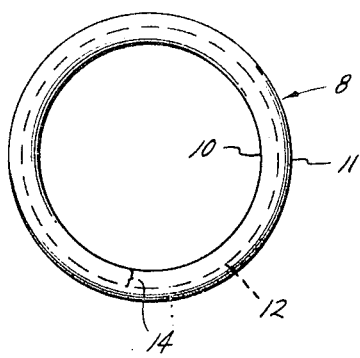
FIGURE 4 is a plan view of the ring shown in FIGURE 3.

The ring 8 is more clearly viewed in FIGURES 3 and 4, and is of a size and configuration suitable for fitting over the end 6 and for being sealed in engagement thereto around the entire circumference of the ring. A desired cross-sectional configuration of the ring 8 is readily seen in the FIGURE 3 embodiment. It is seen that when the ring 8 is in the particular orientation illustrated in FIGURE 3, there is a substantially vertical portion 9 of the ring along the outer surface thereof, the uppermost extremity (when the ring is in the FIGURES 2, 3 and 5 orientation) of this vertical portion being the uppermost edge 10 of the ring. At its end opposite the end 10, the outer surface curves through an arcuate portion 14 to the lowermost extremity 12 of the ring, and then gently curves as on a sphere to the point 11, which defines the outside diameter of the ring. The surface of the underside or inner surface of the ring 8 is configured to best fit against the end 6 of the pin 2. This surface curves from the outside diameter point 11 along an arcuate portion 15 to a point 13 which represents the lowermost extremity of the inner surface, the point 13 being in generally vertical alignment with the point 12 on the outer surface of the ring. The inner surface continues on a curved path from the point 13, and thence progresses to the point 10 through a relatively long straight portion 16 which joins with the vertical portion 9 at an acute angle.

The distances $h$, $d_1$, $d_2$ and $d_3$, which are indicated in FIGURE 5, have been found to be most important for best results of the invention. By way of example, the ring illustrated in FIGURES 4 and 5 is for fitting onto the end of a pin on 2⅜-inch pipe. In this embodiment, the following parameters have been found desirable:

(1) $h$ (height between points 12 and 13), about 0.0938 inch.
(2) $d_1$ (inside diameter of ring), about 1.992 inches.
(3) $d_2$ (outside diameter of ring), about 2.312 inches.
(4) $d_3$ (diameter between outside ends of straight portion 16), about 2.062 inches.
(5) Radius of circle scribing arc 14, about 0.080 inch.
(6) Radius of circle scribing arc 15, about 0.050 inch.
(7) Angle at which portion 16 meets portion 9, about 10°.

If the ring is constructed in this manner, it has been found that it will fit the end 6 of the pin perfectly, forming a tight seal around the entire circumference of the end 6 between the lip of the pin and the adjacent threads, the seal being effective on make-up to prevent fluid flow from the interior of the pipe length to the exterior environs, and providing protection of the coating around the entire circumferential end of the pin.

In general, it is important that the ring 8 afford protection to the coating on the end 6 through about ⅛ inch to about 3/16 inch. That is, the effective overall thickness of the ring over the pin end 6 should be between about one-eighth and about three-sixteenths inch. If the thickness of the ring is much below about one-eighth inch, insufficient protection results because of the tendency of the ring to be damaged, especially upon stabbing during make-up. If the thickness of the ring, however, is above about three-sixteenths inch, the ring begins to interfere with make-up and to become more difficult to apply so that the ring is in engagement with the pin end around the complete circumference of the ring.

It is also important to note that the ring 8 terminates (at point 11) before reaching the threads 4. This is an extremely important feature since it has been found that covering of the threads interferes with make-up of the pipe, at least to the extent that make-up is slowed.

The ring 8 may be constructed of rubber or any suitable elastomeric material. Of course, the material selected must be able to withstand both whatever temperature is required to process the coating after installation of the ring, and whatever environmental conditions the pipe will encounter during use. For oil field use, severe temperature conditions may be encountered down-hole.

One suitable material for construction of the ring 8 has been found to be a fluorinated hydrocarbon polymer marketed by Du Pont under the trademark Viton. This material is stable to a temperature of around 600° F. Other materials which have been found suitable are vinyl polymers such as polyvinyls marketed by the Metal and Thermit Company under the trademark Unichrome. For certain applications, Teflon, a Du Pont polytetrafluoroethylene polymer might be desirable. Natural rubber may be useful if the maximum temperature to which the ring will be subjected is on the order of 250° F.

At least in many instances, an adhesive agent should be applied to the inner surface of the ring 8 to insure proper bonding to the pin end coating. Of course, any suitable adhesive agent may be used for this purpose. By way of example only, the epoxy Araldite 6020, manufactured by Ciba Corp., has been found suitable for use with Viton rings. This particular epoxy may be advantageously cured with a polyamide, such as Versamid 140, a product of General Mills.

The ring 8 should be applied to the pin end after the final application of coating to said pin end, several coating applications usually being required to obtain a coating of the desired thickness. Customarily, the pin is prebaked between each application of coating material; the pin is then cured, or given a final bake, after the last coat has been applied.

For example, in order to obtain a final coating thickness of about 5 to 7 mils over the major part of the pin, four coats may be necessary, with the pin being heated to about 250° F. between each coating application. The final bake or curing temperature might be about 450° F. These conditions depend, of course, on the particular compositions used to coat the pin, and it is understood that the present invention is useful in protecting essentially all types of known pin end coatings.

In accordance with the method according to this invention, a ring 8 of suitable size and dimensions is selected, and the selected ring may desirably be affixed to the pin just before the final bake. In fact, the final bake may be initiated at a lower temperature and the ring applied while the pin is heated; then the temperature can be increased to the ultimate temperature required for the final bake. For example, if the prebaking temperature is 250° F. and the curing temperature is 450° F., the last coating application may be made, and then the pin heated to 250°. With an adhesive coating on the undersurface of the ring 8, the ring may then be applied to the end of the heated pin, whereupon it is securely affixed to the pin end around the entire circumference of the end 6. After the ring is thus applied, the pin is heated to 450° for perhaps 1½ hours to allow the coating to undergo its final bake.

Upon being bonded to the pin end in this manner, the ring 8 becomes an integral part of the pin. The ring thus affords to the pin at this point additional corrosion protection. And although the area protected in this respect by the ring is small, the area is also a vulnerable one from the likelihood of corrosion standpoint, and thus the protection afforded is significant.

Figure 6:
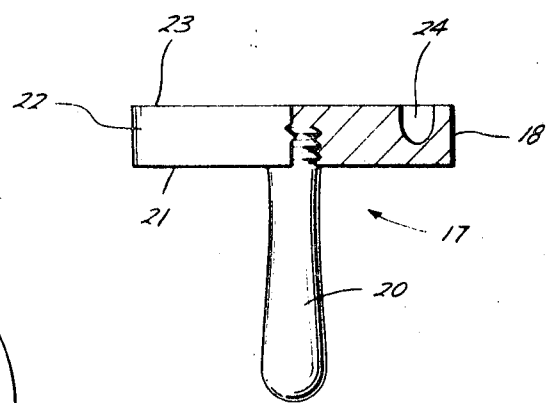
FIGURE 6 is a side view, partially in section, of one embodiment of a tool which may be used to affix a ring constructed in accordance with the invention to a pin portion.

The ring may be applied to the end 6 of the pin in any convenient manner. One suitable method is illustrated with reference to FIGURES 6 and 7, wherein there is shown a hand tool 17 for applying the ring. The tool 17 comprises a generally disk-shaped cylindrical base 18 having an upper face 21, cylindrical side portion 22, and lower face 23. Centrally disposed in the upper face 21 is a suitable handle 20.

Figure 7:
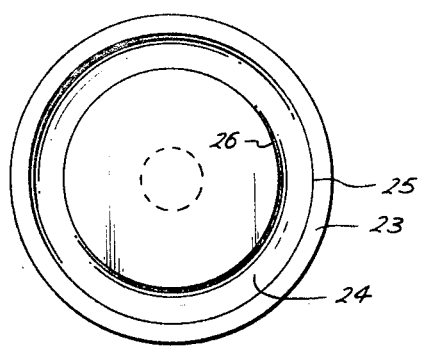
FIGURE 7 is an end view of the tool illustrated in FIGURE 6, showing a groove suitable for positioning therein a ring constructed in accordance with the invention.

The lower face 23 is seen in FIGURE 7 to have a circular groove 24 therein, the groove having an outer wall 25 which curves smoothly into an inner wall 26. The groove 24 is of a size convenient for receiving the ring 8.

Of course, automatic equipment may be used to stab the preformed ring 8 onto the end 6 of the pin, and various apparatus might be desirable for affixing the ring onto the pin end.

The ring thus provided has been found to afford exceptional protection to the pin end during use. The likelihood of damage to the pin end coating, and hence failure of the coating at that point, is significantly decreased when the invention is employed. This advantage is of extreme importance is just about every application wherein pipe lengths of pin-and-box portions are used, especially in oil field uses.

Further, it has been found that after makeup an effective seal is obtained at the pin end area which is superior to prior art seals at this point. As a further advantage, it has been found that use of the invention will in many cases prevent over-torquing in threading the pin into the box. The tolerances employed are such that there is no interference with make-up, and yet adequate protection of the pin end is afforded both during make-up of the joint and during transportation and handling of the pipe. And, as mentioned above, the ring 8 is integral with the pin and provides corrosion protection at the pin end.

While the invention has been described in terms of particularly advantageous embodiments, it will be understood by those skilled in the art that various changes may be made in the structures described herein without departing from the scope of the invention.

I claim:

1. A method of protecting the end of a threaded pin of a pipe length from physical damage, comprising:
   applying to said pin an uncured coating of a material suitable for preventing corrosion of said pipe;
   prebaking said coating by sufficiently heating said pin;
   repeating the above steps a sufficient number of times to obtain a coating of the desired thickness;
   applying to the pin end a ring of elastomeric material so that said ring is in engagement with said pin end around the entire circumference of said ring and so that the threads of said pin are not covered; and
   thence heating said pin to a temperature sufficient to effect a final cure of said coating material.

2. The method of protecting an end of a coated pipe, said pipe and its end having one or more coatings of corrosion resistant material applied thereto while in an uncured condition, said method including the steps of:
   applying a coating of a corrosion resistant material in an uncured condition to the pipe and at least one end thereof;
   applying to said end of the pipe a corrosion resistant adhesive material;
   applying to said pipe end a protector ring of elastomeric material which engages the entire circumference of the pipe end;
   said adhesive material and the protector ring being applied prior to final curing of the corrosion resistant material; and
   finally curing said corrosion resistant material whereby said protector ring becomes an integral part of the pipe end thereby to provide permanent protection for the corrosion resistant coating on said pipe end.

3. The method of protecting an end of a coated pipe, said pipe and its end having one or more coatings of corrosion resistant material applied thereto, said material being applied in an uncured condition and requiring a baking at an elevated temperature to achieve final curing, said method including the steps of:
   applying a coating of a corrosion resistant material in an uncured condition to the pipe and its end;
   applying to said end of the pipe a corrosion resistant adhesive material;
   applying to the end of the pipe having the adhesive material a protector ring of elastomeric material which engages the entire circumference of the pipe end;
   said adhesive material and the ring of elastomeric material being applied prior to final curing of the most recently applied corrosion resistant material;
   baking said coating of corrosion resistant material and the adhesive material at a sufficiently elevated temperature and for a sufficient length of time to achieve substantially complete curing thereof, whereby said ring of elastomeric material becomes an integral part of the pipe end thereby to provide permanent protection for the corrosion resistant coating on said pipe end.

4. The method claimed in claim 3 wherein, the coated pipe is internally coated and externally threaded adjacent its coated end; and
   said ring of elastomeric material terminates at said end of the pipe and does not cover said threads.

5. The method claimed in claim 4 wherein said ring of elastomeric material has an inner curved surface substantially conformal to said pipe end and an outer surface of generally arcuate configuration.

References Cited

UNITED STATES PATENTS

| | | | |
|---|---|---|---|
| 489,949 | 1/1893 | Harrington | 138—109 XR |
| 1,120,731 | 12/1914 | McIlroy | 138—96 |
| 2,233,734 | 3/1941 | Ely et al. | 285—55 |
| 3,192,612 | 7/1965 | Elliott et al. | 285—55 XR |
| 3,352,574 | 11/1967 | Brian | 138—96 XR |

H. HAMPTON HUNTER, Primary Examiner

U.S. Cl. X.R.

117—95; 138—96; 285—55